United States Patent [19]
Suchowski et al.

[11] Patent Number: 5,701,849
[45] Date of Patent: *Dec. 30, 1997

[54] DEVICE INCLUDING BUCKLE MEANS FOR RELEASE OF A PET COLLAR

[75] Inventors: Bernard Suchowski, Marlboro, N.J.; George Carroll, Greenwood Lakes, N.Y.

[73] Assignee: The Hartz Mountain Corporation, Secaucus, N.J.

[*] Notice: The term of this patent shall not extend beyond the expiration date of Pat. No. 5,443,039.

[21] Appl. No.: 517,248

[22] Filed: Aug. 21, 1995

Related U.S. Application Data

[63] Continuation-in-part of Ser. No. 357,061, Dec. 14, 1994, Pat. No. 5,443,039.

[51] Int. Cl.$^6$ ............................................. A01K 27/00
[52] U.S. Cl. ............................................. 119/865
[58] Field of Search ................... 119/863, 864, 119/865, 792, 793; 24/115 F, 625, 662, 620, 681, 602

[56] References Cited

U.S. PATENT DOCUMENTS

| | | | |
|---|---|---|---|
| 394,506 | 12/1888 | Riley | 119/863 |
| 1,425,153 | 8/1922 | Vigneault | 24/625 |
| 2,612,139 | 9/1952 | Collins | 119/865 |
| 2,791,202 | 5/1957 | Doyle | 119/860 |
| 3,589,341 | 6/1971 | Krebs | 119/865 |
| 4,020,795 | 5/1977 | Marks | 119/863 |
| 4,031,859 | 6/1977 | Stewart | 119/865 |
| 4,044,725 | 8/1977 | Miller | 119/865 |
| 4,068,624 | 1/1978 | Ramney | 119/860 |
| 4,180,016 | 12/1979 | George | 119/865 |
| 4,712,280 | 12/1987 | Fildan | 24/625 |
| 4,881,492 | 11/1989 | Jones | 119/865 |
| 4,924,815 | 5/1990 | Halla | 119/864 |
| 5,027,477 | 7/1991 | Seron | 119/865 |
| 5,322,037 | 6/1994 | Tozawa | 119/865 |
| 5,329,885 | 7/1994 | Sporn | 119/864 |
| 5,443,039 | 8/1995 | Suchowski | 119/865 |

FOREIGN PATENT DOCUMENTS

| | | |
|---|---|---|
| 9219 118 | 11/1992 | Switzerland . |
| 1208636 | 10/1970 | United Kingdom . |
| 2034396 | 11/1978 | United Kingdom . |
| 2263721 | 4/1993 | United Kingdom . |

*Primary Examiner*—Paul J. Hirsch
*Attorney, Agent, or Firm*—Kuhn and Muller

[57] ABSTRACT

A safety-buckle collar, which may also include parasitic-killing features, is a device for releasing a collar of a pet animal, such as a cat or dog, when the pet animal tries to free itself from an obstacle, such as a tree branch or fence portion, in which the collar becomes entangled. The safety-buckle collar may also include a belt member having a chemical substance for killing fleas and ticks, so that the collar is both a safety-buckle collar and a flea and tick killing collar.

5 Claims, 12 Drawing Sheets

DEVICE INCLUDING BUCKLE MEANS FOR RELEASE OF A PET COLLAR

This application is a continuation-in-part of application Ser. No. 08/357,061 filed Dec. 14, 1994, now U.S. Pat No. 5,443,039.

FIELD OF THE INVENTION

The present invention is related to collars for animals, and more particularly to collars (including dual purpose safety collars of which one purpose is to contain parasite killing chemical substances) which release from pet animals upon entanglement.

BACKGROUND OF THE INVENTION

Several prior patents on releasable animal collars teach the use of a releasable pin removably attachable within a buckle receptacle. However, none addresses the configurations of the embodiments of the present invention.

Prior art patents include those with pins which are released from receptacles upon exertion of above normal tensional forces by an animal upon the collar. Among these patents are U.S. Pat. No. 2,612,139 (Collins) and U.S. Pat. No. 4,044,725 (Miller), both of which include an adjustable, releasable link including a knob insertable within a spherical receptacle. In addition, U.S. Pat. No. 3,540,089 (Franklin) and U.S. Pat. No. 3,994,265 (Banks) describe releasable ball and receptacle tethers. U.S. Pat. No. 4,180,016 (George) and United Kingdom Pat. Application No. GB22274000A disclose receptacles within which the free ends of the collar straps are inserted. U.S. Pat. No. 5,027,477 (Seron), U.S. Pat. No. 4,881,492 (Jones), and Australian Pat. No. 220,897 disclosed flat expandable forked pins engagable within receptacles. Moreover, U.S. Pat. No. 2,900,696 (Bacon) discloses a male section with winged projections, insertable within a receptacle with detents.

Furthermore, Applicant's co-pending patent application describes a safety receptacle buckle which includes a female portion having an internal tongue portion engagable with the inside aperture formed by partially encircling prongs of a forked male portion, wherein the male portion is releasably insertable into the female portion.

OBJECTS OF THE INVENTION

An object of the present invention is to provide a collar for a pet animal which is releasable if the collar is caught on a tree branch, fence portion or like obstacle.

It is another object to provide a releasable safety collar for pet animals which also functions as a parasite killing device for parasites, such as fleas and ticks.

It is a further object to improve upon the disadvantages of the prior art.

SUMMARY OF THE INVENTION

The dual purpose safety-buckle and parasitic (flea and tick) killing collar of the present invention includes a novel release device for releasing a collar of a pet animal, such as a cat or dog, when the pet animal tries to free itself from an obstacle, such as a tree branch or fence portion, in which the collar becomes entangled.

In one embodiment, the release device includes a belt member and a receptacle buckle, wherein the receptacle buckle has a belt adjustment structure, which belt adjustment structure allows the belt member and the receptacle buckle to function as an adjustable collar substantially around the neck of a pet animal so as to provide an appropriate fit.

To install the collar at an appropriate fit around the neck of the animal, the belt member of the collar is first placed around the animal's neck. The end of the collar belt member which is not attached to the receptacle buckle is threaded through loops attached to the female buckle portion. Preferably, the loops each comprise an arch formed by a bridge member connecting two side wing portions, to permit the belt member of the collar to be extended therethrough.

After the belt member has been threaded through the buckle loops, the user establishes the appropriate collar size, and joins the two parts of the receptacle buckle together, wherein the receptacle buckle includes a female portion and a male portion, wherein further the male portion is releasably insertable into the female portion. The receptacle buckle is substantially attached to the belt member.

The belt adjustment structure and the female portion together form a substantially integrally unified body of material which comprises one part of the receptacle buckle. The male portion comprises another part of the receptacle buckle.

The female portion and the male portion are disengagable from each other so as to release the adjustable collar from around the neck of the pet animal when the adjustable collar is substantially entangled by an obstacle encountered by the pet animal.

The device for releasing collar of a pet animal includes the belt adjustment structure including a plurality of loops through which the belt member may be moved so as to provide an appropriate fit.

The plurality of loops of the belt adjustment structure preferably includes a means for providing a substantially snug fit of the belt member, wherein the loops include a loop preferably having a piercing projecting body of material which substantially engages the belt member so as to substantially stop enlargement of the circumference formed by the belt member upon the application of force to de-insert a part of the belt member already inserted through a loop.

In one safety buckle embodiment, the male portion includes a forked element including corresponding prongs, and the female portion includes an interior rounded tongue snap portion which is releasably engagable between the corresponding prongs. The internal tongue portion of the female portion is engagable with the inside aperture formed by partially encircling prongs of the forked male portion.

In an alternate embodiment, another releasable collar device also releases a pet animal, such as a cat or dog, when the pet animal tries to free itself from an obstacle, such as a tree branch or fence portion, in which the collar becomes entangled.

The alternate releasable collar device also includes a belt member and a receptacle buckle, wherein the receptacle buckle also has a belt adjustment structure, which allows the belt member and the receptacle buckle to function as an adjustable collar substantially around the neck of a pet animal so as to provide an appropriate fit.

The alternate receptacle buckle includes a female portion which includes a receiving means having two interior side walls, wherein further each of the two interior side walls have one indentation each.

In this alternate embodiment, a male portion comprises a body of material including two exterior sides, each of which is substantially alignable with an interior side wall. The exterior sides may each contain a rounded protuberance insertable within each of the indentations on each of the interior side walls.

In a third embodiment, the male portion may be circular, wherein opposite arcuate segments of the circumference of the circular male portion engage similarly sized and shaped arcuate indentations on the interior side walls of the female portion.

The present invention can be made of a material substantially comprised of plastic, and/or another suitable substance or substances. Preferably, the male and female portion of the buckle are made of a slightly flexible material, to form a firm but releasable fit of the male and female portion.

The above noted releasable devices may preferably function as at least dual purpose collars. First, the collars which may include a safety buckle means for release of a pet collar from the neck of a collar-entangled pet animal.

The belt members may include at least one chemical substance for killing parasites, such as fleas and ticks, from the body of the pet animal, such as a cat or dog.

DESCRIPTION OF THE DRAWINGS

The present invention can best be understood in conjunction with the accompanying drawings, in which.

LIST OF REFERENCE NUMERALS:

12: releasing collar device
13: belt member
14: receptacle buckle
15: belt adjustment structure
16: female portion of receptacle buckle
17: male portion of receptacle buckle
18: loop of belt adjustment structure
19a: bridge member of belt adjustment structure
19b: winged member of belt adjustment structure
19c: winged member of belt adjustment structure
20: loop of belt adjustment structure
20a: bridge member of belt adjustment structure
20b: winged member of belt adjustment structure
20c: winged member of belt adjustment structure
21: pointed projecting body of material
22: circumference of releasing collar device
23: forked element of male portion
23a: corresponding prong of forked element
23b: corresponding prong of forked element
24: rounded tongue snap of female portion
35: integrally unified body of material comprising both belt adjustment structure and female portion
52: releasing collar device
53: belt member
54: receptacle buckle
55: belt adjustment structure
55a: bridge member of belt adjustment structure
55b: bridge member of belt adjustment structure
56: female portion of receptacle buckle
56a: interior wall side
56b: interior wall side
56c: indentation in female portion
56d: indentation in female portion
56e: cantilevered tab
56f: cantilevered tab
57: male portion of receptacle buckle
57a: exterior side of male portion
57b: exterior side of male portion
57c: protuberance of male portion
57d: protuberance of male portion
58a: wall
58b: wall
59: central bridge
62: circumference of releasing collar device
63: attachment means
64: integrally unified body of material comprising both belt adjustment structure and female portion
65: pointed projecting body of material
66: pointed projecting body of material 73: belt member
74: receptacle buckle
75: belt adjustment structure
75a: bridge member of belt adjustment structure
75b: bridge member of belt adjustment structure
76: female portion of receptacle buckle
76a: interior wall side
76b: interior wall side
76c: indentation in female portion
76d: indentation in female portion
76e: cantilevered tab
76f: cantilevered tab
77: male portion of receptacle buckle
77a: exterior side of male portion
77b: exterior side of male portion
78a: wall
78b: wall
79: central bridge
83: attachment means
84: integrally unified body of material comprising both belt adjustment structure and female portion
85: pointed projecting body of material
86: pointed projecting body of material

DETAILED DESCRIPTION OF THE PREFERRED EMBODIMENTS

As shown in FIGS. 1, 2, 3A, 4A, 4B, 4C, 4D, one embodiment for a safety collar of the present invention includes releasing collar device 12 for a pet animal, such as a cat or dog, when the pet animal tries to free itself from an obstacle, such as a tree branch or fence portion, in which collar 12 becomes entangled.

Figure 1:
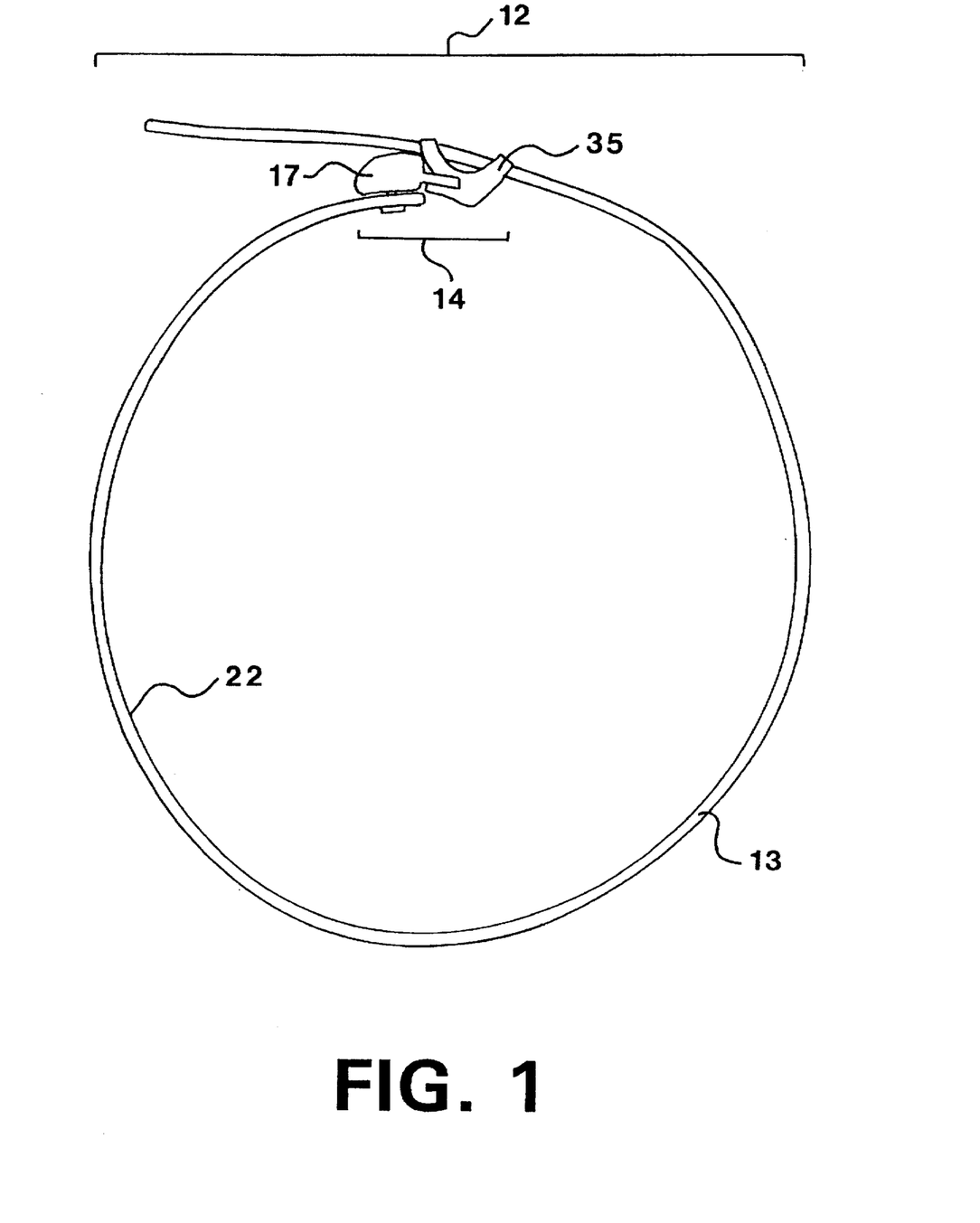
FIG. 1 is a side elevational view of one embodiment of a parasite killing safety collar of the present invention.
Figure 2:
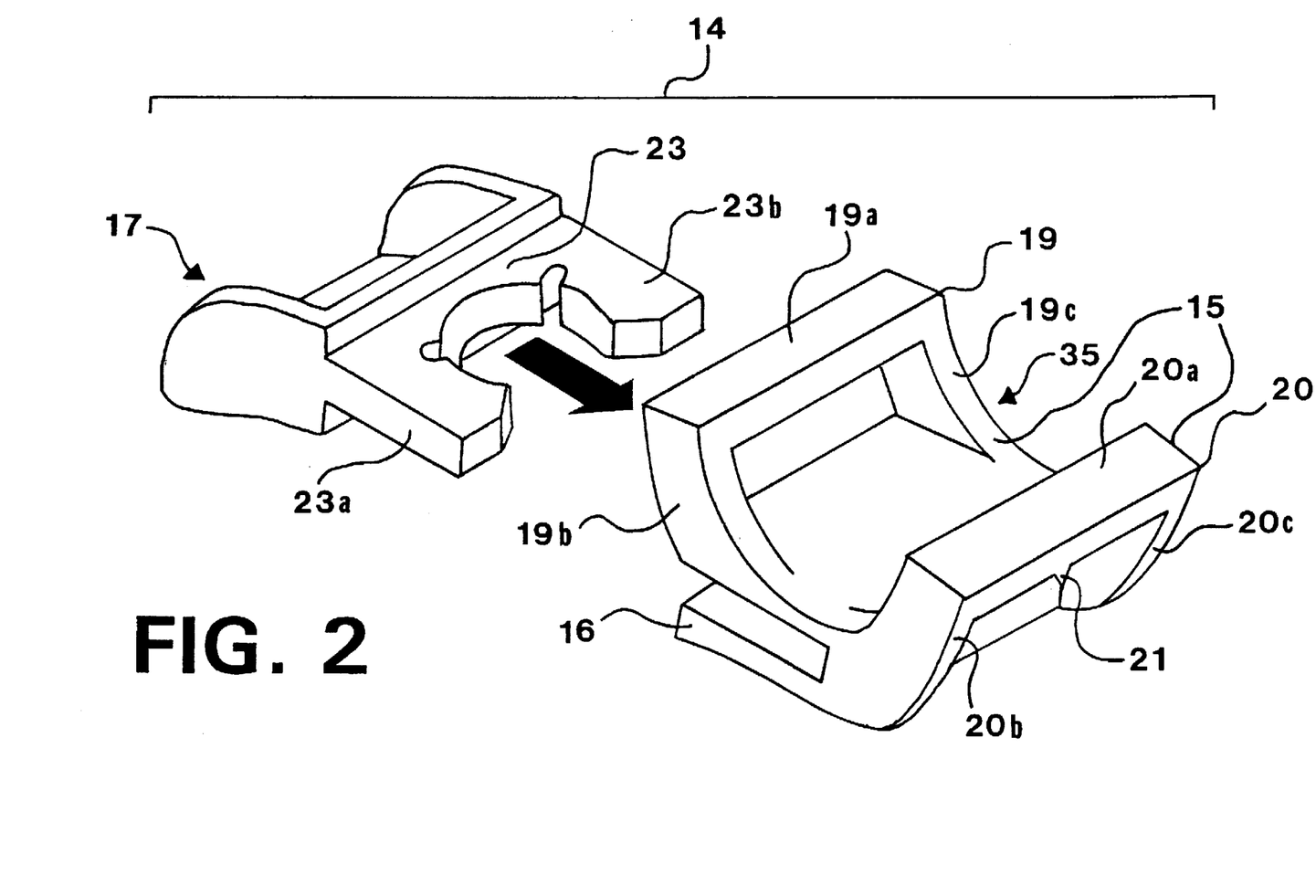
FIG. 2 is a perspective view of the male portion and the female portion of the safety collar as in FIG. 1.

Releasing collar device 12 includes belt member 13 and receptacle buckle 14, wherein receptacle buckle 14 has belt adjustment structure 15, which belt adjustment structure 15 allows belt member 13 and receptacle buckle 14 to function as adjustable collar 12 substantially around the neck of a pet animal so as to provide an appropriate fit.

Receptacle buckle 14 includes female portion 16 and male portion 17, wherein male portion 17 is releasably insertable into female portion 16. Receptacle buckle 14 is substantially attached to belt member 13.

Figure 3A:
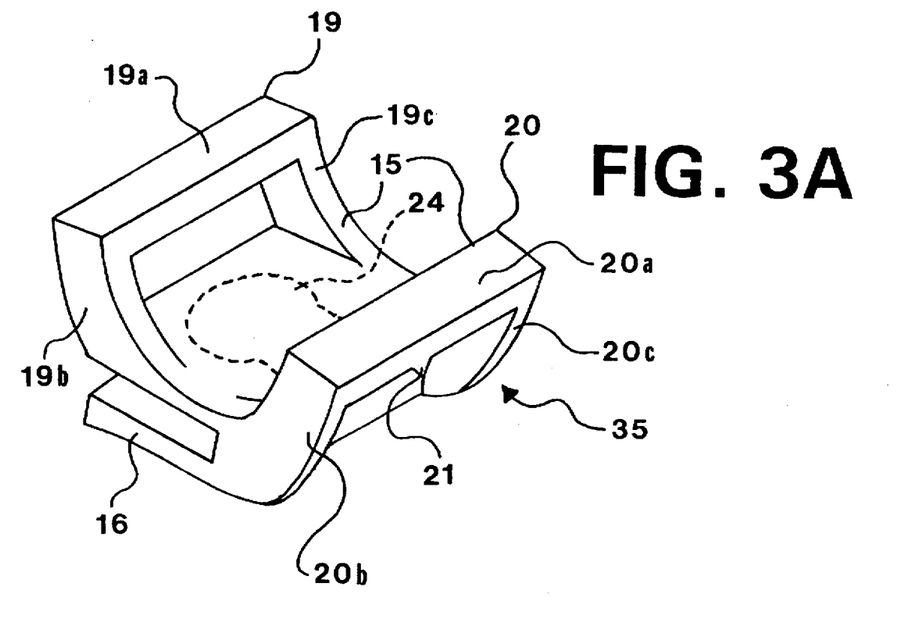
FIG. 3A is a perspective view of the female portion of the safety collar as in FIG. 1.
Figure 3B:
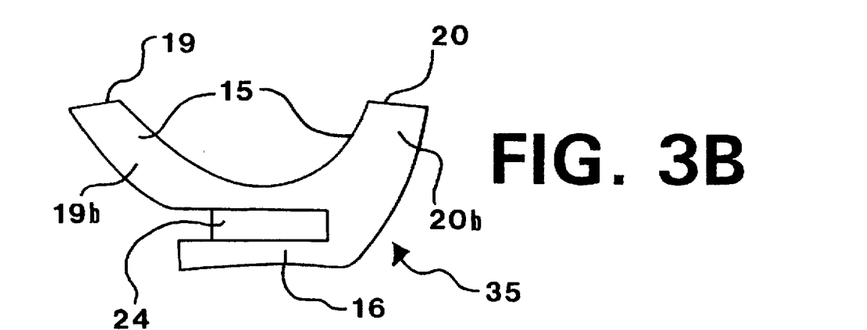
FIG. 3B is a side elevational view of the female portion of the safety collar as in FIG. 1.

Belt adjustment structure 15 and female portion 16 form a substantially integrally unified body of material 35 which comprises one part of receptacle buckle 14. Male portion 17 comprises another part of receptacle buckle 14.

Female portion 16 and male portion 17 are disengagable from each other so as to release adjustable collar 12 from around the neck of the pet animal when adjustable collar 12 is substantially entangled by an obstacle encountered by the pet animal.

Releasing collar device 12 for a pet animal includes belt adjustment structure 15 including a plurality of loops 19 & 20 through which belt member 13 may be moved so as to provide an appropriate fit.

Loops 19 and 20 are preferably shaped so as to have an aperture through which belt member 13 is insertable so as to form a substantially snug fit. Loop 19 preferable includes bridge member 19a connected on each side thereof by pair of wing members 19b & 19c. Loop 20 includes bridge member 20a connected on each side thereof by pair of wing members 20b and 20c.

Plurality of loops 19 and 20 include a means for providing a substantially snug fit of belt member 13, wherein either loop 19 or 20 of plurality of loops 19 and 20 include at least one pointed projecting body of material 21 which substantially engages belt member 13, so as to substantially stop enlargement of circumference 22 formed by belt member 13, upon application of force to de-insert a part of belt member 13 already inserted through loop 19.

Figure 4A:
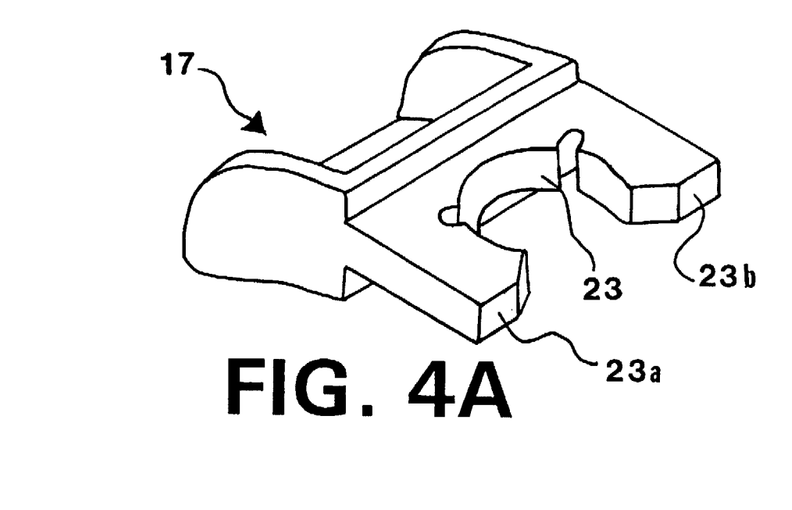
FIG. 4A is a perspective view of the male portion as in FIG. 1.
Figure 4B:
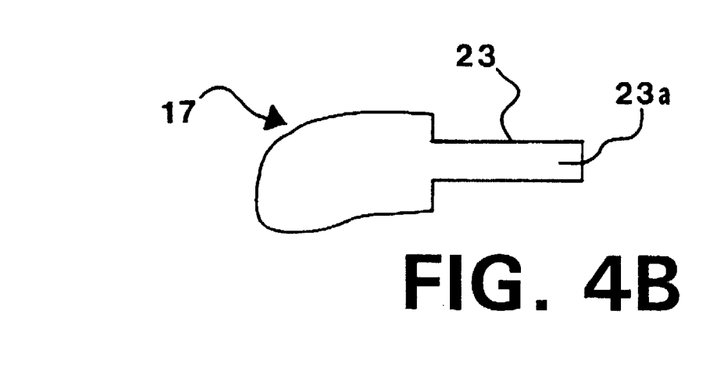
FIG. 4B is a side elevational view of the male portion as in FIG. 1.
Figure 4C:
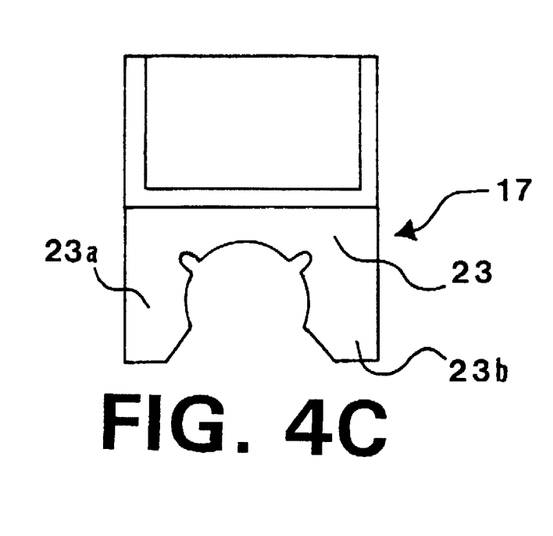
FIG. 4C is a top plan view of the male portion as in FIG. 1.
Figure 4D:
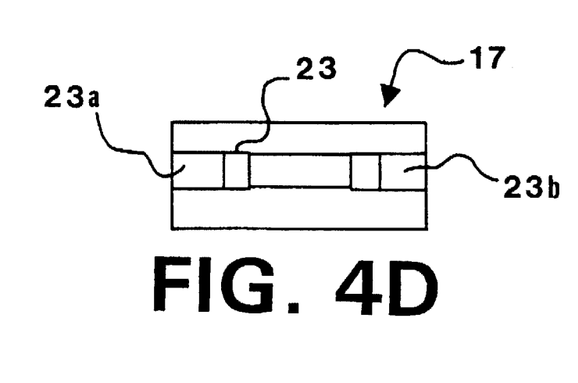
FIG. 4D is a front elevational view of the male portion as in FIG. 1.

In one embodiment, male portion 17 includes a forked element 23 including corresponding prongs 23a and 23b, and female portion 16 includes an interior rounded tongue snap portion 24 releasably engagable between corresponding prongs 23a and 23b. Interior rounded tongue snap portion 24 of female portion 16 is engagable with the inside aperture formed by partially encircling prongs 23a & 23b of forked male portion 17.

In an alternate embodiment, as shown in FIGS. 5, 6A, 6B, 7, 8A, 8B, 9A, 9B, 9C, 9D and 9E releasing collar 52 releases a pet animal, such as a cat or dog, when the pet animal tries to free itself from an obstacle, such as a tree branch or fence portion, in which collar 52 becomes entangled.

Figure 5:
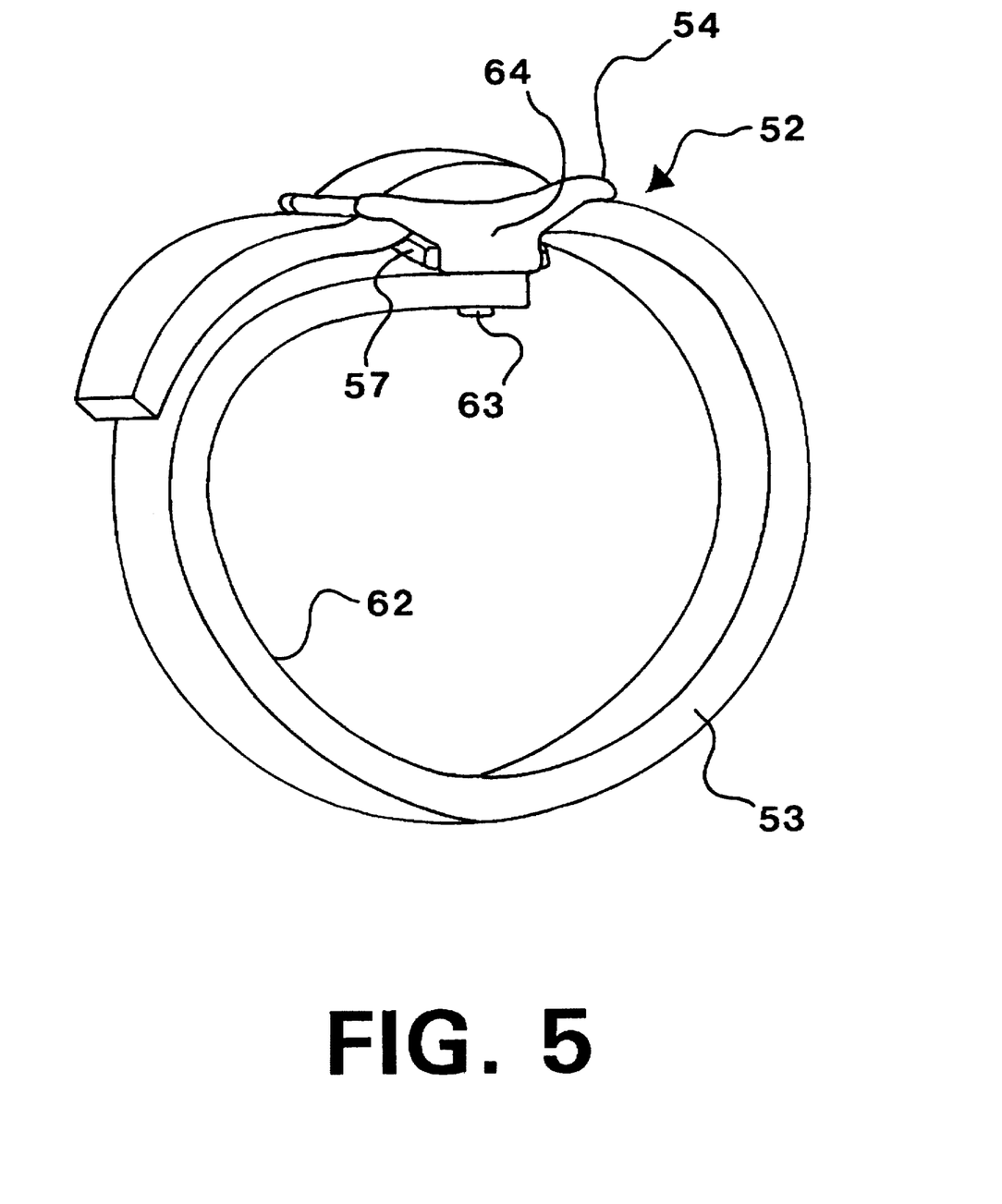
FIG. 5 is a perspective view of a second embodiment of a parasite killing safety collar of the present invention.

Releasing collar device 52 includes belt member 53, comprising circumference 62 of safety collar 52, wherein receptacle buckle 54 has belt adjustment structure 55, which belt adjustment structure 55 including pointed projecting bodies of material 66 and 66 which allow belt member 53 to belt member 53 and receptacle buckle 54 to function as adjustable collar 52 substantially around the neck of a pet animal, so as to provide an appropriate fit.

Figure 6A:
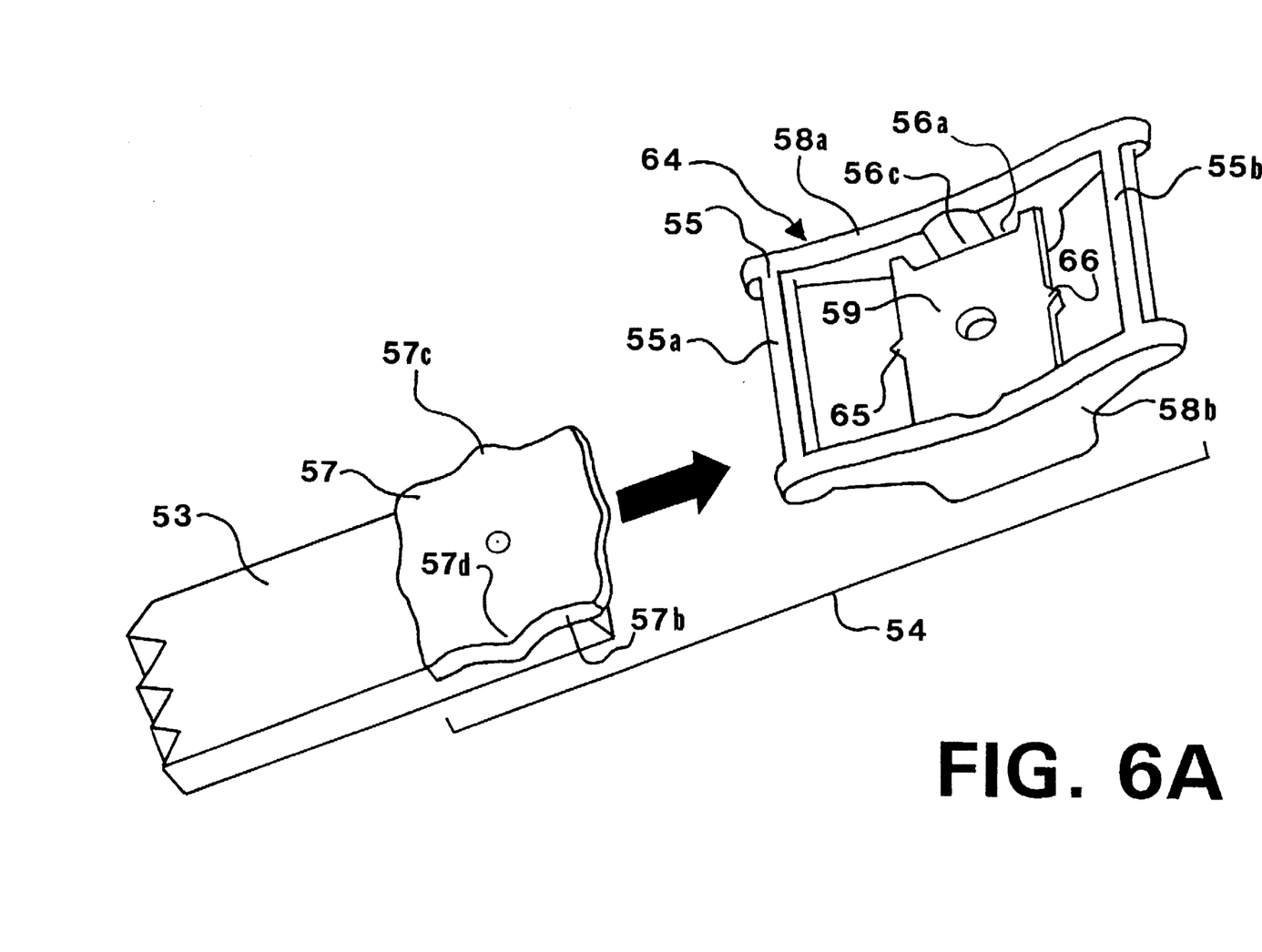
FIG. 6A is a perspective view of the female portion and the male portion of the safety collar as in FIG. 5.
Figure 6B:
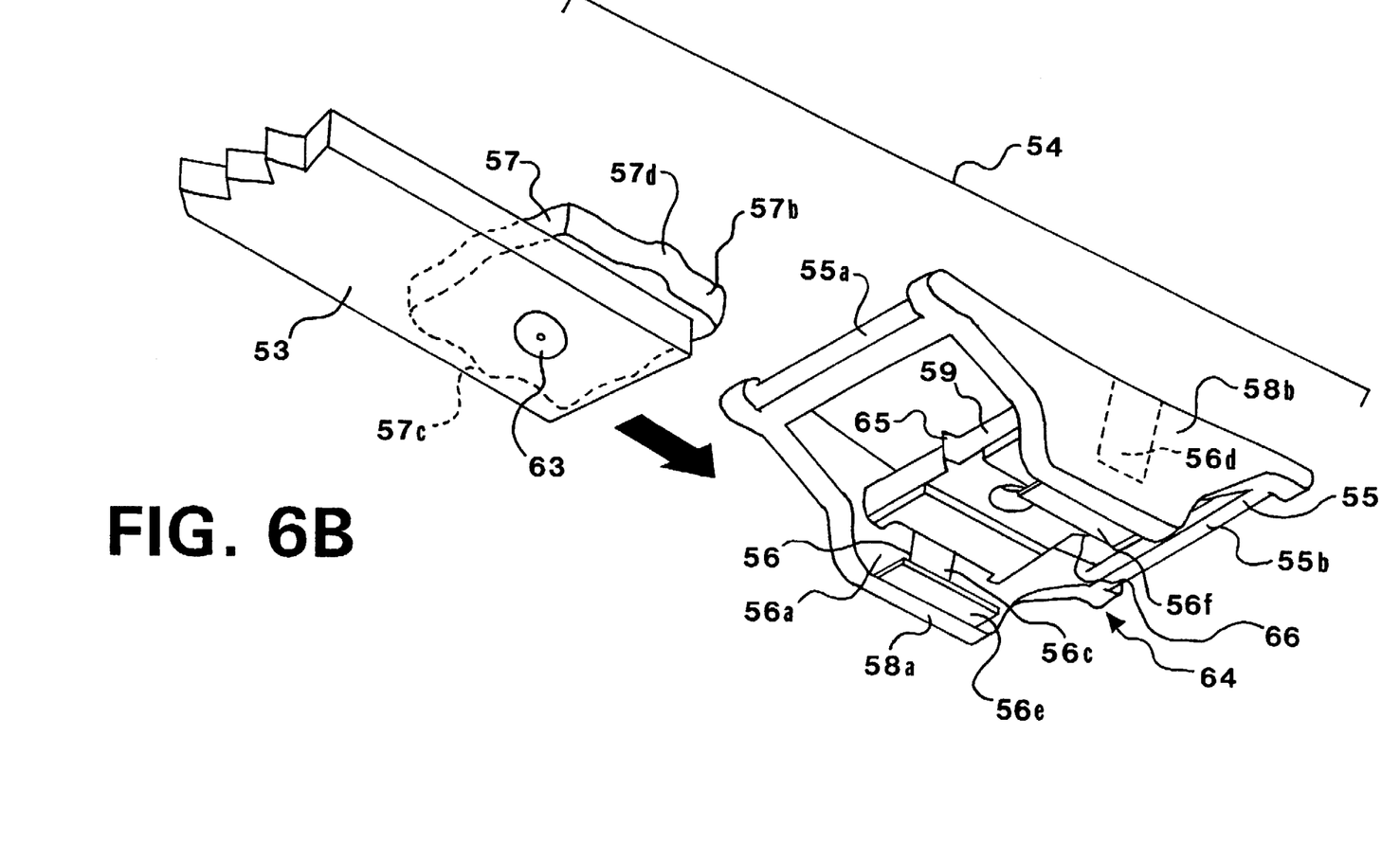
FIG. 6B is an exploded bottom perspective view of the safety collar as in FIG. 5.
Figure 9A:
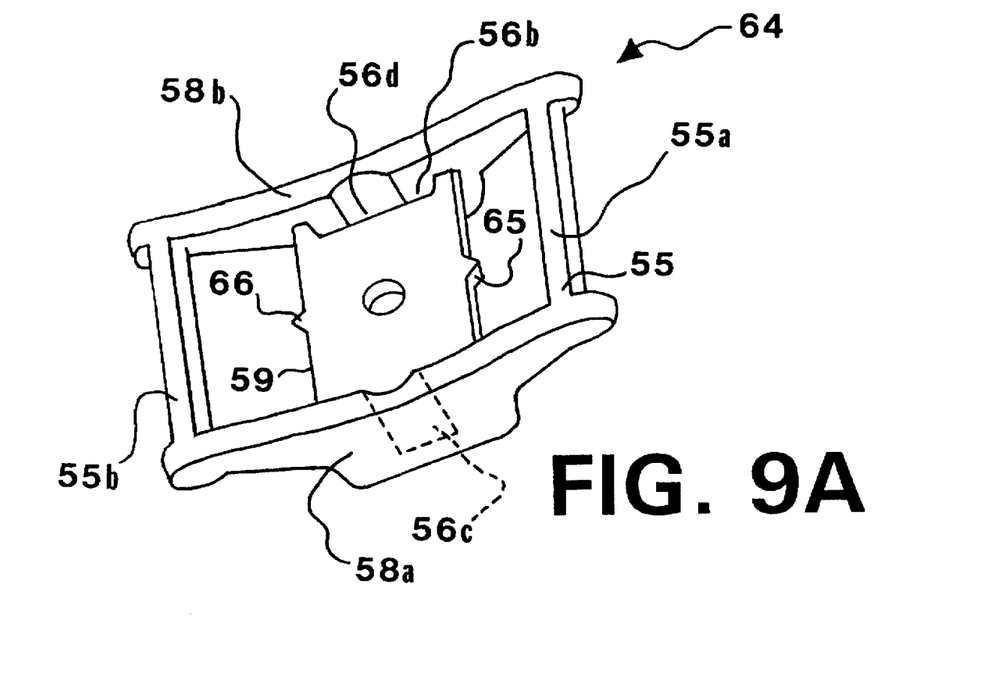
FIG. 9A is a top perspective view of the female portion of the safety collar as in FIG. 5.
Figure 9B:
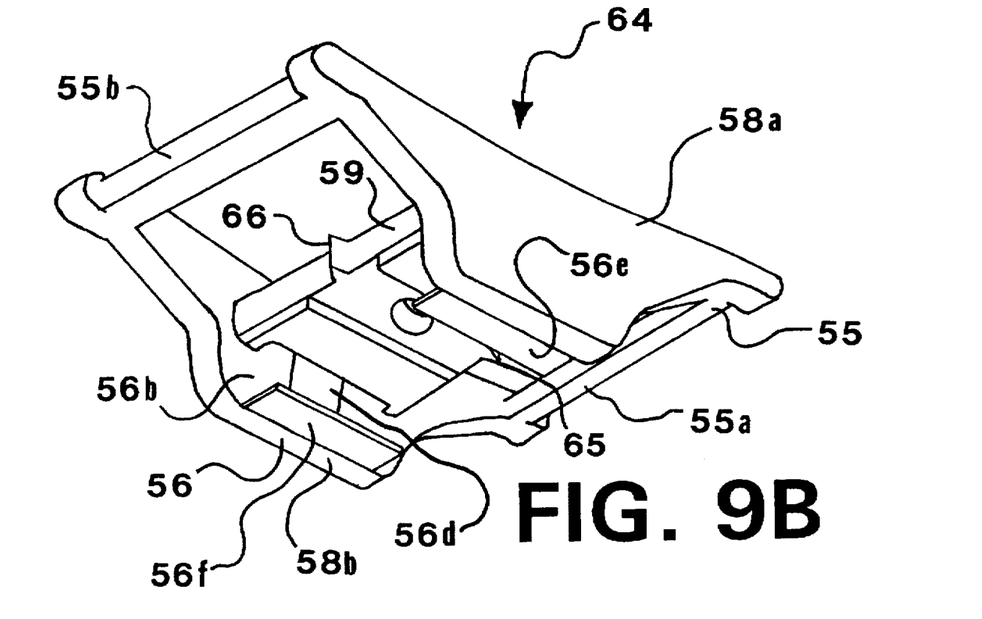
FIG. 9B is a bottom perspective view of the female portion of the safety collar as in FIG. 5.
Figure 9C:
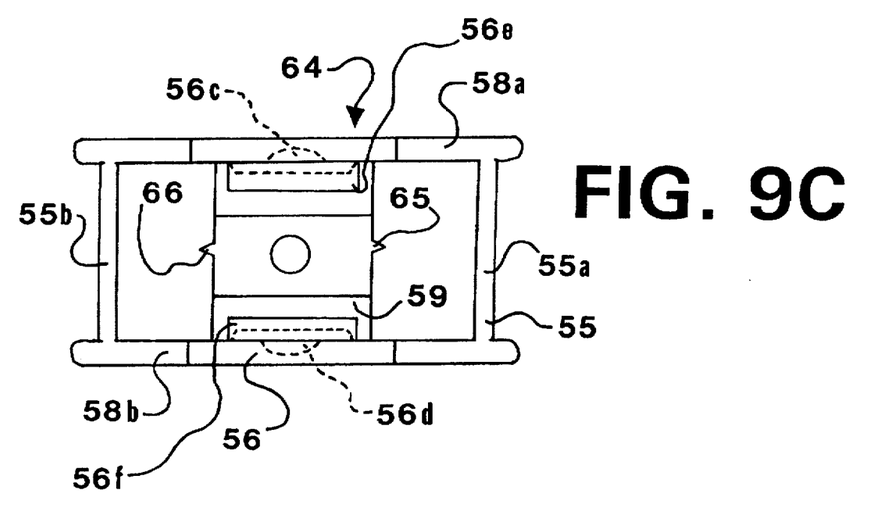
FIG. 9C is a top plan view of the female portion of the safety collar as in FIG. 5.
Figure 9D:
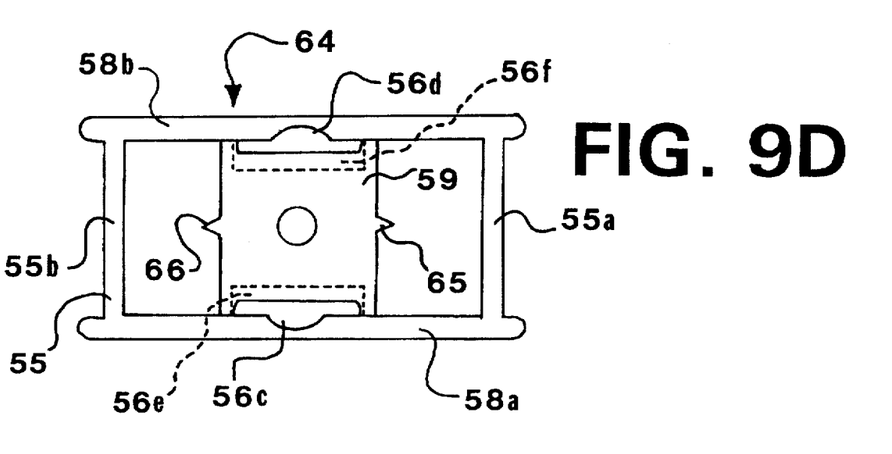
FIG. 9D is a bottom view of the female portion of a safety collar as in FIG. 5.
Figure 9E:
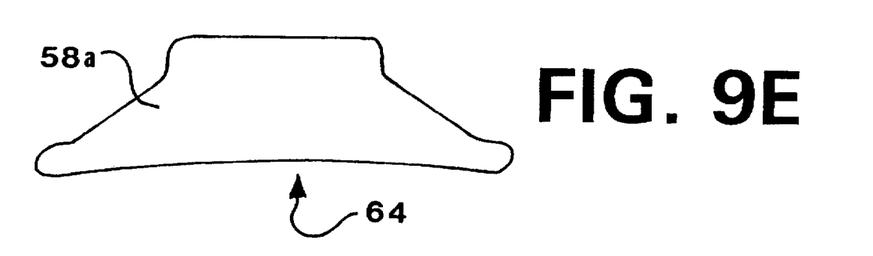
FIG. 9E is a side elevational view upside down of the female portion of the safety collar as in FIG. 5.

Receptacle buckle 54 includes unified body of material 64 including belt adjustment structure 55 and female portion 56 which includes receiving means comprising walls 58a and 58b, respectively. Walls 58a and 58b are preferably connected by central bridge 59 and side bridge members 55a and 55b respectively. Walls 58a and 58b respectively include two interior side walls 56a and 56b, wherein each of two interior side walls 56a and 56b have one indentation 56c or 56d for insertion of protuberances 57c and 57d of male portion 57.

Figures 7, 8A, 8B:
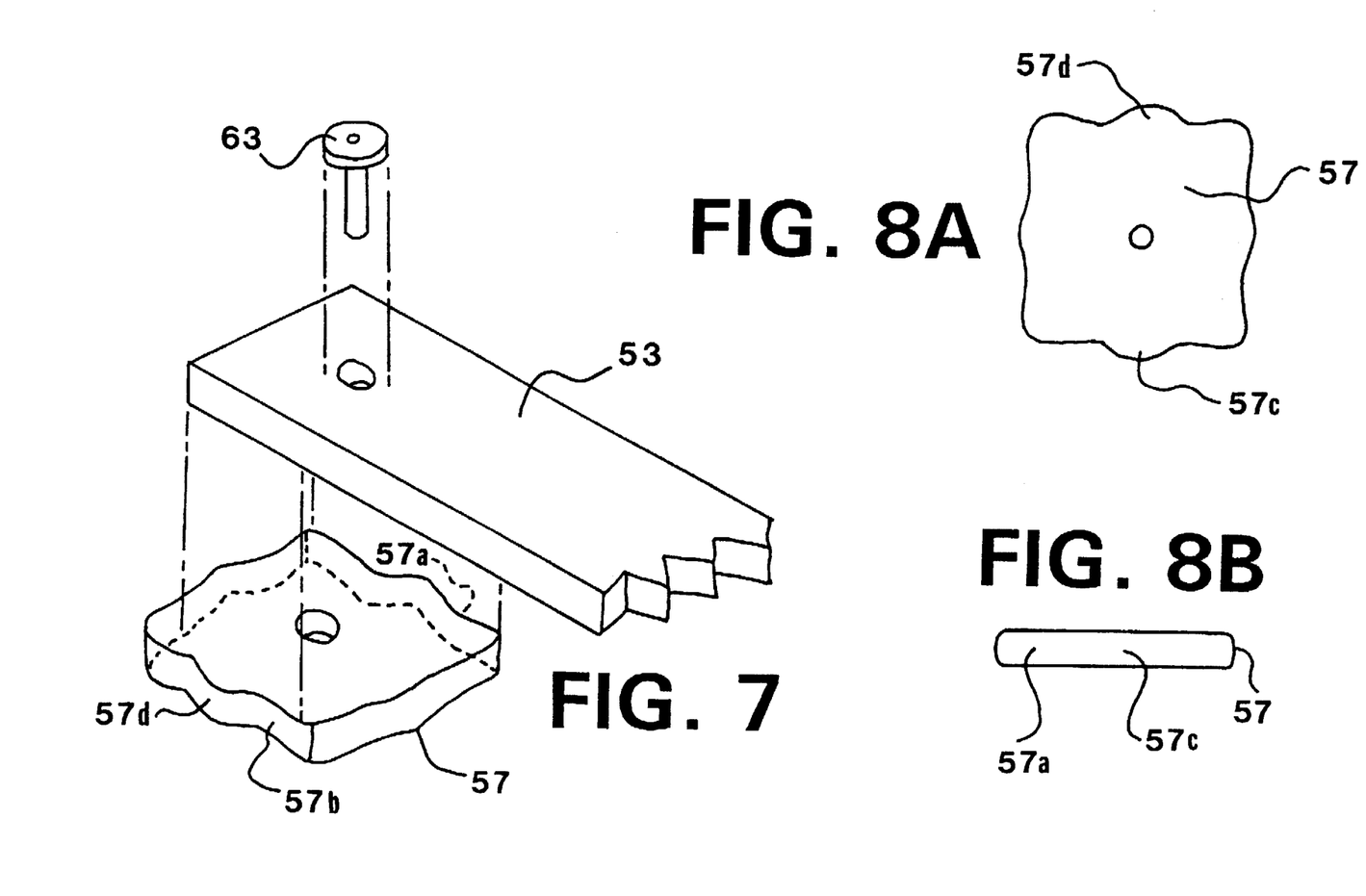
FIG. 7 is an exploded perspective view of the male portion as in FIG. 5.
FIG. 8A is a top plan view of the male portion of the safety collar as in FIG. 5.
FIG. 8B is a side elevational view of the male portion of the safety collar as in FIG. 5.

In this alternate embodiment, male portion 57 comprises a body of material including two exterior sides 57a and 57b each having respective protuberances 57c and 57d, each of which is substantially alignable with indentations 56c or 56d of interior side wall 56a or 56b.

Male portion 57 is also held in place within female portion 56 by cantilevered tabs 56e and 56f which extend inward from inner walls 56a and 56b.

Male portion 57 is connected to belt member 53 by attachment means 63.

In a third embodiment shown in FIGS. 10A, 10B, 11A, 11B, 12A, 12B, releasing collar 52 may have alternative belt member 73, and receptacle buckle 74 with belt adjustment structure 75, comprising unified body of material 84 having pointed projections 85 and 86 and female portion 76. Female portion 76 preferably has walls 78a, 78b having interior side walls 76A and 76B respectively connected by central bridge 79 and bridge member 75a, 75b. Male portion 77 is preferably a flattened cylinder with a top edge which is circular. Arcuate wall segments 77a and 77b of circular male portion 77 are insertable within indentations 76c and 76d of female portion 76, wherein indentations 76c and 76d have radii equal to the radius of circular male portion 77.

Figures 10A, 11A:
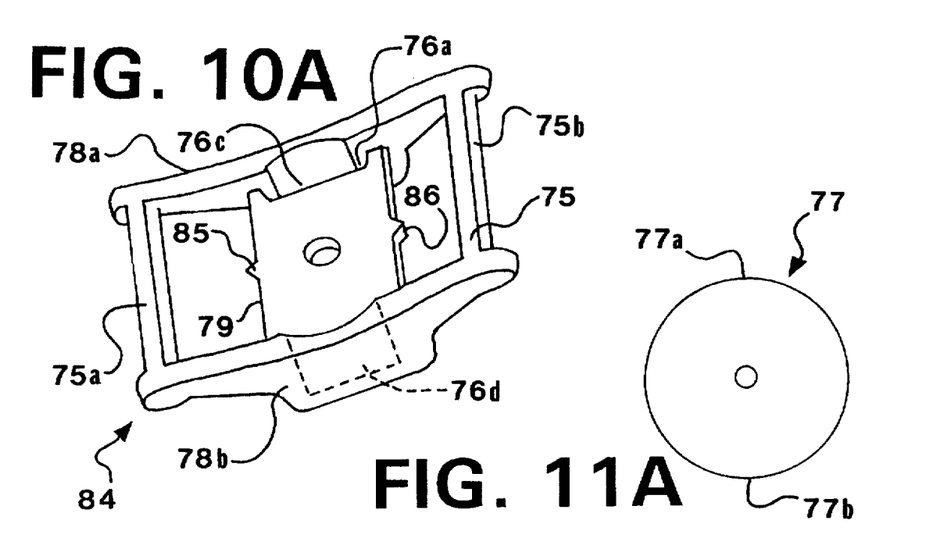
FIG. 10A is a top perspective view of the female portion of another embodiment for a safety collar of the present invention.
FIG. 11A is a top plan view of the male portion of the safety collar as in FIG. 10A.
Figures 10B, 11B:
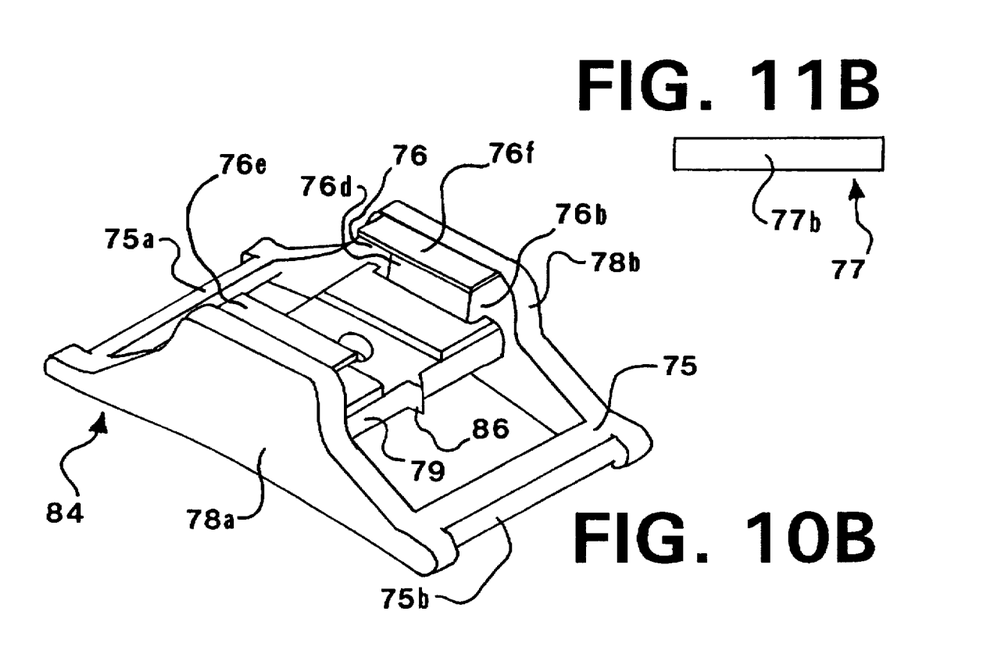
FIG. 10B is a bottom perspective view of the female portion of the safety collar as in FIG. 10A.
FIG. 11B is a side elevational view of the male portion of the safety collar as in FIG. 11A; and, FIG. 12A is an exploded top plan view of the male portion and the female portion of the safety collar as in FIGS. 10A and 11A respectively, and, FIG. 12B is an exploded bottom view of the male portion and the female portion of the safety collar as in FIGS. 10A and 11A respectively.
Figure 12A:
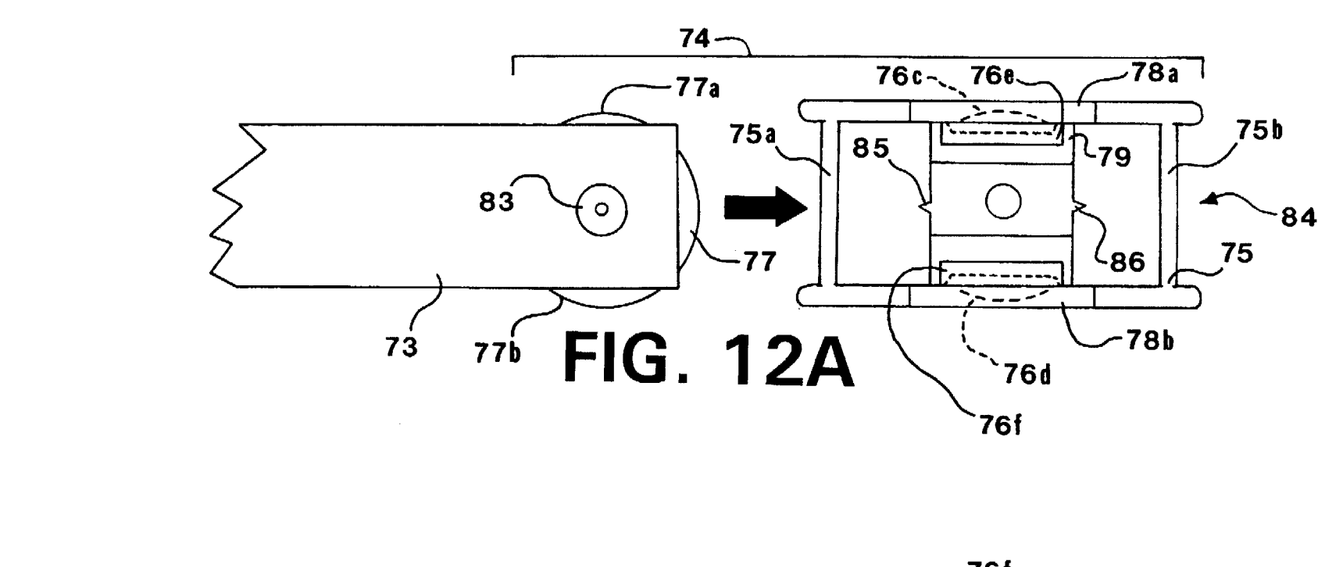
Figure 12B:
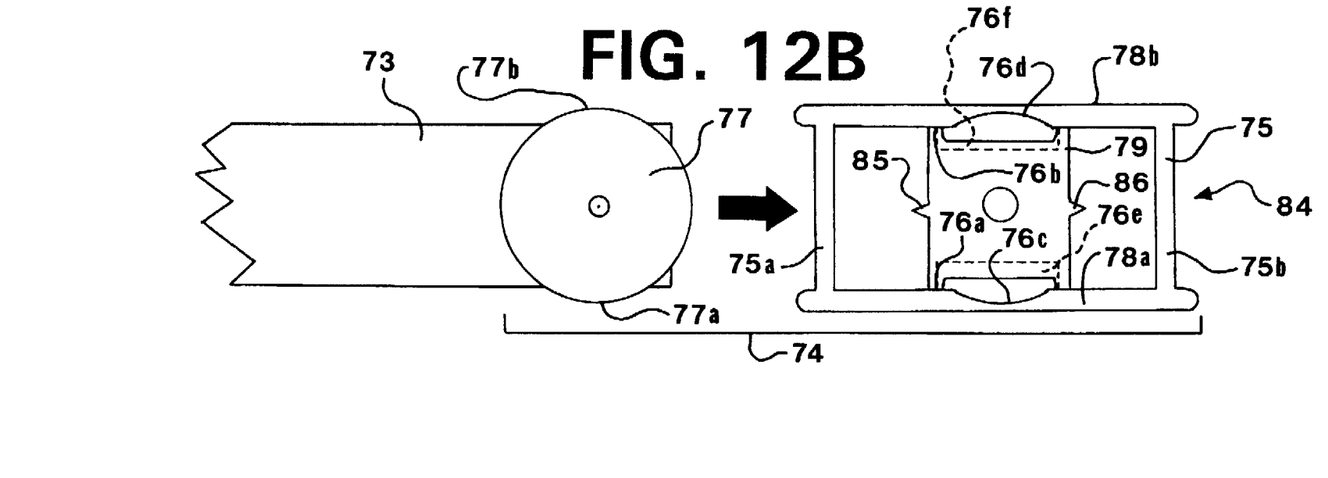

Male portion 77 is also held in place within female portion 76 by cantilevered tabs 76e and 76f which extend inward from inner walls 76a and 76b.

Either releasable collar device 12 or alternate releasable collar device 52 can be made of a material substantially comprised of plastic or another suitable substance or substances.

It is noted that releasable collar device 12 or device 52 may preferably function as at least dual purpose collars, wherein collar device 12 or device 52 may first include a safety buckle means for release from the neck of a pet animal, as noted above.

Moreover, it is noted that the belt adjustment structures, including loops and pointed belt engaging members, may be alternatively provided integral with the male portion, instead of the female portion.

Furthermore, cantilevered tabs 56e and 56f as well as cantilevered tabs 76e and 76f may be provided in one continuous arch, instead of two separate cantilevered tabs.

However, belt members 13 or 53 may also include at least one chemical substance for killing parasites such as insects or arthropods, such as fleas and ticks, from the body of a pet animal such as a cat and a dog.

It is therefore noted that other modifications may be made to the present invention without departing from the scope of the present invention, as noted in the appended claims.

What is claimed is:

1. A device for releasing a collar of a pet animal, such as a cat or dog, when the pet animal tries to free itself from an obstacle, such as s tree branch or fence portion, in which the collar becomes entangled, said device comprising:

a belt member, a receptacle buckle, said receptacle buckle having a belt adjustment structure which allows said belt member and said receptacle buckle to function as an adjustable collar substantially around the neck of a pet animal so as to provide an appropriate fit, said receptacle buckle having a female portion and a male portion, said male portion being releasably insertable into said female portion, said receptacle buckle being substantially attached to said belt member, said belt adjustment structure and one other portion of said receptacle buckle forming a substantially integrally unified body of material, said one other portion of said receptacle buckle being either said female portion or said male portion, said female portion and said male portion being disengagable from each other so as to release said adjustable collar from around the neck of said pet animal when said adjustable collar is substantially entangled by an obstacle encountered by said pet animal.

wherein said belt adjustment structure comprises a plurality of loops through which said belt member may be moved so as to provide said appropriate fit, wherein further said plurality of loops comprise means for providing a substantially snug fit of said belt member, and wherein said plurality of loops includes a loop having at least one pointed projecting body of material extending from at least one pair of each plurality of loops said at least one pointed protecting body of material substantially engages with said belt member so as to substantially stop enlargement of the circumference formed by said belt member upon application of force to de-insert a part of said belt member already inserted through said loop.

2. The device for releasing a collar of a pet animal as claimed in claim 1, wherein said belt adjustment structure includes said female portion.

3. The device for releasing a collar of a pet animal as claimed in claim 1, wherein said belt member includes at least one chemical substance for killing parasites on the body of a pet animal.

4. The device for releasing a collar of a pet animal as claimed in claim 1, wherein said belt member includes at least one chemical substance for killing fleas and ticks from the body of a pet animal.

5. The device for releasing a collar of a pet animal as claimed in claim 1, wherein said male portion further comprises a flattened cylinder having a circular shape with a predetermined radius, said male portion having a plurality of arcuate segmented edge portions insertable within a plurality of arcuate indentations of said interior side walls of said exterior lateral walls said female portion, wherein the radii of each of said arcuate segmented edge portions are substantially equal to said predetermined radius of said male portion.

* * * * *